(12) United States Patent
Wang et al.

(10) Patent No.: US 12,045,295 B2
(45) Date of Patent: Jul. 23, 2024

(54) INDEXABLE AND SEARCHABLE REPLAY OF WEBSITE USER BEHAVIOR

(71) Applicant: AURYC, INC., Los Altos, CA (US)

(72) Inventors: Jinlin Wang, Los Altos, CA (US); Amod Setlur, Los Altos, CA (US); Feng Shao, Los Altos, CA (US)

(73) Assignee: Auryc, Inc., Los Altos, CA (US)

( * ) Notice: Subject to any disclaimer, the term of this patent is extended or adjusted under 35 U.S.C. 154(b) by 612 days.

(21) Appl. No.: 16/135,393

(22) Filed: Sep. 19, 2018

(65) Prior Publication Data
US 2019/0087503 A1    Mar. 21, 2019

Related U.S. Application Data

(60) Provisional application No. 62/561,039, filed on Sep. 20, 2017.

(51) Int. Cl.
| | |
|---|---|
| *G06F 16/954* | (2019.01) |
| *G06F 9/451* | (2018.01) |
| *G06F 16/9535* | (2019.01) |
| *G06F 16/955* | (2019.01) |
| *H04L 67/02* | (2022.01) |
| *H04L 67/14* | (2022.01) |
| *H04L 67/50* | (2022.01) |
| *H04L 67/146* | (2022.01) |

(52) U.S. Cl.
CPC .......... *G06F 16/9535* (2019.01); *G06F 9/451* (2018.02); *G06F 16/955* (2019.01); *H04L 67/02* (2013.01); *H04L 67/14* (2013.01); *H04L 67/535* (2022.05); *H04L 67/146* (2013.01)

(58) Field of Classification Search
CPC ............ G06F 11/3438; G06F 11/3466; G06F 16/951; G06F 2201/86; G06F 11/3476; G06F 16/954; G06F 3/0481; G06F 16/9535; G06Q 30/02; G06Q 30/0256; G06Q 30/00; G06Q 30/0241; G06Q 30/0601; G06Q 30/0633; G06Q 30/0641; H04L 12/1831; H04L 41/22; H04L 63/302; Y10S 707/99934
USPC ........ 707/673, 711, 721, 739–741, 768, 830, 707/E17.2, E17.057, E17.83–84, E17.12, 707/E17.18
See application file for complete search history.

(56) References Cited

U.S. PATENT DOCUMENTS

| | | | |
|---|---|---|---|
| 6,237,138 B1 * | 5/2001 | Hameluck ............... | G06F 11/34 702/182 |
| 6,901,438 B1 * | 5/2005 | Davis ................... | G06F 16/958 714/E11.193 |

(Continued)

*Primary Examiner* — Tony Mahmoudi
*Assistant Examiner* — Linh Black
(74) *Attorney, Agent, or Firm* — Schwegman Lundberg & Woessner, P.A.

(57) ABSTRACT

Systems and methods are provided for indexable and searchable replay of website user behavior. The method includes recording actions of users on a website; grouping the recorded actions into a plurality of sessions; defining a plurality of critical events for at least one webpage of the website, wherein each of the critical events represents a possible action of the users on the at least one webpage; labeling each critical event with a time stamp; receiving a request to replay one of the sessions; and responsive to the request, replaying the one of the sessions according to the time stamps.

21 Claims, 6 Drawing Sheets

(56) References Cited

U.S. PATENT DOCUMENTS

| | | | | |
|---|---|---|---|---|
| 7,349,871 B2* | 3/2008 | Labrou | G06Q 50/188 | 705/76 |
| 8,001,013 B2* | 8/2011 | Serbanescu | G06Q 30/0601 | 705/26.4 |
| 8,042,055 B2* | 10/2011 | Wenig | G06Q 30/02 | 715/765 |
| 8,429,630 B2* | 4/2013 | Nickolov | H04L 67/1021 | 717/148 |
| 8,670,529 B1* | 3/2014 | Fomin | H04L 65/1083 | 379/265.09 |
| 8,682,977 B1* | 3/2014 | Roy | G06F 16/954 | 709/205 |
| 9,047,147 B2* | 6/2015 | Francis | G06F 16/95 | |
| 9,672,537 B1* | 6/2017 | Dietrich | G06Q 30/0271 | |
| 9,723,037 B2* | 8/2017 | Roy | H04L 65/403 | |
| 9,747,191 B1* | 8/2017 | Marolia | G06F 11/3466 | |
| 9,887,992 B1* | 2/2018 | Venkat | H04W 12/06 | |
| 9,936,034 B1* | 4/2018 | Brooks | H04L 67/02 | |
| 10,210,453 B2* | 2/2019 | Krishnamurthy | G06Q 30/0241 | |
| 10,606,983 B2* | 3/2020 | Thesman | G16H 15/00 | |
| 2005/0283752 A1* | 12/2005 | Fruchter | G06F 16/7837 | 700/88 |
| 2007/0005776 A1* | 1/2007 | Hansen | H04L 67/535 | 709/227 |
| 2009/0183179 A1* | 7/2009 | Keith | G06Q 30/02 | 719/318 |
| 2010/0153427 A1* | 6/2010 | Schechter | G06F 16/951 | 707/768 |
| 2011/0173239 A1* | 7/2011 | Sayed | G06F 11/3414 | 718/1 |
| 2011/0182283 A1* | 7/2011 | Van Buren | H04W 4/14 | 704/270.1 |
| 2011/0231771 A1* | 9/2011 | Tovar | G06F 16/9535 | 715/736 |
| 2012/0166468 A1* | 6/2012 | Gupta | G06F 16/9535 | 707/768 |
| 2012/0173966 A1* | 7/2012 | Powell | H04L 67/02 | 715/234 |
| 2012/0290399 A1* | 11/2012 | England | G06Q 50/01 | 705/14.66 |
| 2013/0290854 A1* | 10/2013 | Shukla | G06Q 30/02 | 715/736 |
| 2013/0325869 A1* | 12/2013 | Reiley | G06F 16/41 | 707/741 |
| 2013/0339839 A1* | 12/2013 | Baran | G06F 11/3438 | 715/255 |
| 2014/0074850 A1* | 3/2014 | Noel | G06F 11/0709 | 707/741 |
| 2014/0280185 A1* | 9/2014 | Nordstrom | G06F 16/951 | 707/741 |
| 2015/0304386 A1* | 10/2015 | Schwarzbauer | H04L 43/08 | 709/203 |
| 2015/0379571 A1* | 12/2015 | Grbovic | G06Q 30/0256 | 705/14.54 |
| 2016/0042079 A1* | 2/2016 | Johnson | G06F 3/0482 | 707/754 |
| 2016/0110669 A1* | 4/2016 | Iyer | G06Q 10/06315 | 705/7.25 |
| 2016/0182627 A1* | 6/2016 | Navanageri | H04L 67/1095 | 709/219 |
| 2016/0191554 A1* | 6/2016 | Kaminsky | H04L 63/1425 | 726/23 |
| 2016/0266730 A1* | 9/2016 | Franke | G06F 16/954 | |
| 2016/0320758 A1* | 11/2016 | Park | G05B 15/02 | |
| 2016/0378731 A1* | 12/2016 | Powell | H04L 67/02 | 715/234 |
| 2017/0063653 A1* | 3/2017 | Kieviet | G06F 11/3466 | |
| 2017/0289267 A1* | 10/2017 | Eschbach | H04L 67/142 | |
| 2019/0361717 A1* | 11/2019 | Santos | G06F 9/451 | |

* cited by examiner

INDEXABLE AND SEARCHABLE REPLAY OF WEBSITE USER BEHAVIOR

RELATED APPLICATIONS

This application claims the benefit of U.S. Provisional Application No. 62/561,039, filed Sep. 20, 2017, the disclosure thereof incorporated by reference herein in its entirety.

TECHNICAL FIELD

The disclosure relates generally to computer technology, particularly, to a method and a device for indexable and searchable replay of web site user behavior.

BACKGROUND

People frequently interact with and utilize machines to perform various tasks. For example, computers connected through the Internet have been serving as terminals for information exchange, goods purchase, etc. To promote their products, services, or ideas, content hosts usually have a great interest in attracting traffic to their websites, applications, or other portals. For the hosts, it is desirable to track and understand the behaviors of the users, based on which appropriate contents can be rendered at the right time and in the right form to induce positive responses. Nevertheless, existing technologies fall short in providing customizable systems and methods for the host to understand user behaviors.

To provide a customized system and method for the host to understand user behaviors, this disclosure proposes a method and a system for indexable and searchable replay of user behaviors.

SUMMARY

One aspect of the present disclosure is directed to a method for user behavior replay. The method may include: collecting user behavior data in session; identifying and labeling critical events with time stamps for each session of user behavior data; replaying the labeled user behavior data.

Another aspect of the present disclosure is directed to a device for indexable and searchable replay of user behavior data. The device may include a data collection unit, an analysis unit and a replay unit. The data collection unit may be configured to collect user behavior data in session. The analysis unit may be configured to identify and label critical events with time stamps for each session of user behavior data. The replay unit may be configured to replay the labeled user behavior data.

Another aspect of the present disclosure is directed to a non-transitory computer-readable medium for indexable and searchable user behavior replay. The non-transitory computer-readable medium may include instructions stored therein. The instructions, when executed by one or more processors, may cause the one or more processors to perform a method for replaying user behavior. The method may include collecting user behavior data in session; identifying and labeling critical events with time stamps for each session of user behavior data; replaying the labeled user behavior data.

In general, one aspect disclosed features a method comprising: recording actions of users on a website; grouping the recorded actions into a plurality of sessions; defining a plurality of critical events for at least one webpage of the website, wherein each of the critical events represents a possible action of the users on the at least one webpage; labeling each critical event with a time stamp; receiving a request to replay one of the sessions; and responsive to the request, replaying the one of the sessions according to the time stamps.

Embodiments of the method may include one or more of the following features. Some embodiments comprise receiving a search query that specifies at least one of the critical events; and responsive to receiving the search query, providing one or more sessions that include the at least one of the critical events. In some embodiments, the grouping comprises: grouping a plurality of the recorded actions into one of the sessions when (i) the plurality of the recorded actions are defined as critical events, (ii) the plurality of the recorded actions correspond to one of the users, and (iii) no two consecutive ones of the plurality of the recorded actions are separated in time by more than a predetermined interval. In some embodiments, the labeling comprises: labeling each critical event in a session with a time stamp relative to a start of the session. Some embodiments comprise recording one or more critical parameters, wherein each of the critical parameters represents at least one of a time duration, a time stamp, a geographic location, item information for an item offered for sale on the at least one webpage, user information, and classification of the user; identifying each session with a session ID; receiving a search query that specifies at least one of the critical events, the time stamps, the session IDs, and the critical parameters; and responsive to receiving the search query, providing the recorded actions corresponding to the at least one of the critical events, the time stamps, the session IDs, and the critical parameters. In some embodiments, the defining a plurality of critical events comprises at least one of: defining one of the critical events as a one-page event, wherein each one-page event is effective only within a particular one of the webpages; and defining one of the critical events as a whole-website event, wherein each whole-website event is effective in all the webpages of the website. Some embodiments comprise providing a user interface for the defining the plurality of critical events, wherein the user interface is a WSYIWYG editor or program. Some embodiments comprise receiving a request to replay only a portion of the one of the sessions; and responsive to the request, replaying only the portion of the one of the sessions.

In general, one aspect disclosed features a non-transitory computer-readable medium having instructions stored therein, the instructions being executable by one or more processors to cause the one or more processors to perform a method comprising: recording actions of users on a website; grouping the recorded actions into a plurality of sessions; defining a plurality of critical events for at least one webpage of the website, wherein each of the critical events represents a possible action of the users on the at least one webpage; labeling each critical event with a time stamp; receiving a request to replay one of the sessions; and responsive to the request, replaying the one of the sessions according to the time stamps.

Embodiments of the medium may include one or more of the following features. In some embodiments, the method further comprises: receiving a search query that specifies at least one of the critical events; responsive to receiving the search query, providing one or more sessions that include the at least one of the critical events. In some embodiments, the grouping comprises: grouping a plurality of the recorded actions into one of the sessions when (i) the plurality of the recorded actions are defined as critical events, (ii) the plurality of the recorded actions correspond to one of the users, and (iii) no two consecutive ones of the plurality of the recorded actions are separated in time by more than a predetermined interval. In some embodiments, the labeling comprises: labeling each critical event in a session with a time stamp relative to a start of the session. In some embodiments, the method further comprises: recording one or more critical parameters, wherein each of the critical parameters represents at least one of a time duration, a time stamp, a geographic location, item information for an item offered for sale on the at least one webpage, user information, and classification of the user; identifying each session with a session ID; receiving a search query that specifies at least one of the critical events, the time stamps, the session IDs, and the critical parameters; and responsive to receiving the search query, providing one or more sessions that include the at least one of the critical events. In some embodiments, the defining a plurality of critical events comprises at least one of: defining one of the critical events as a one-page event, wherein each one-page event is effective only within a particular one of the webpages; and defining one of the critical events as a whole-website event, wherein each whole-website event is effective in all the webpages of the website. In some embodiments, the method further comprises: providing a user interface for the defining the plurality of critical events, wherein the user interface is a WSYIWYG editor or program. In some embodiments, the method further comprises: receiving a request to replay only a portion of the one of the sessions; and responsive to the request, replaying only the portion of the one of the sessions.

In general, one aspect disclosed features a system comprising: one or more processors; and a non-transitory computer-readable system having instructions stored therein, the instructions being executable by one or more processors to cause the one or more processors to perform a method comprising: recording actions of users on a website; grouping the recorded actions into a plurality of sessions; defining a plurality of critical events for at least one webpage of the website, wherein each of the critical events represents a possible action of the users on the at least one webpage; labeling each critical event with a time stamp; receiving a request to replay one of the sessions; and responsive to the request, replaying the one of the sessions according to the time stamps.

Embodiments of the system may include one or more of the following features. In some embodiments, the method further comprises: receiving a search query that specifies at least one of the critical events; responsive to receiving the search query, providing one or more sessions that include the at least one of the critical events. In some embodiments, the grouping comprises: grouping a plurality of the recorded actions into one of the sessions when (i) the plurality of the recorded actions are defined as critical events, (ii) the plurality of the recorded actions correspond to one of the users, and (iii) no two consecutive ones of the plurality of the recorded actions are separated in time by more than a predetermined interval. In some embodiments, the labeling comprises: labeling each critical event in a session with a time stamp relative to a start of the session. In some embodiments, the method further comprises: recording one or more critical parameters, wherein each of the critical parameters represents at least one of a time duration, a time stamp, a geographic location, item information for an item offered for sale on the at least one webpage, user information, and classification of the user; identifying each session with a session ID; receiving a search query that specifies at least one of the critical events, the time stamps, the session IDs, and the critical parameters; and responsive to receiving the search query, providing one or more sessions that include the at least one of the critical events. In some embodiments, the defining a plurality of critical events comprises at least one of: defining one of the critical events as a one-page event, wherein each one-page event is effective only within a particular one of the webpages; and defining one of the critical events as a whole-website event, wherein each whole-website event is effective in all the webpages of the website. In some embodiments, the method further comprises: providing a user interface for the defining the plurality of critical events, wherein the user interface is a WSYIWYG editor or program. In some embodiments, the method further comprises: receiving a request to replay only a portion of the one of the sessions; and responsive to the request, replaying only the portion of the one of the sessions.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this disclosure, illustrate several non-limiting embodiments and, together with the description, serve to explain the disclosed principles.

DETAILED DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

Figure 1:
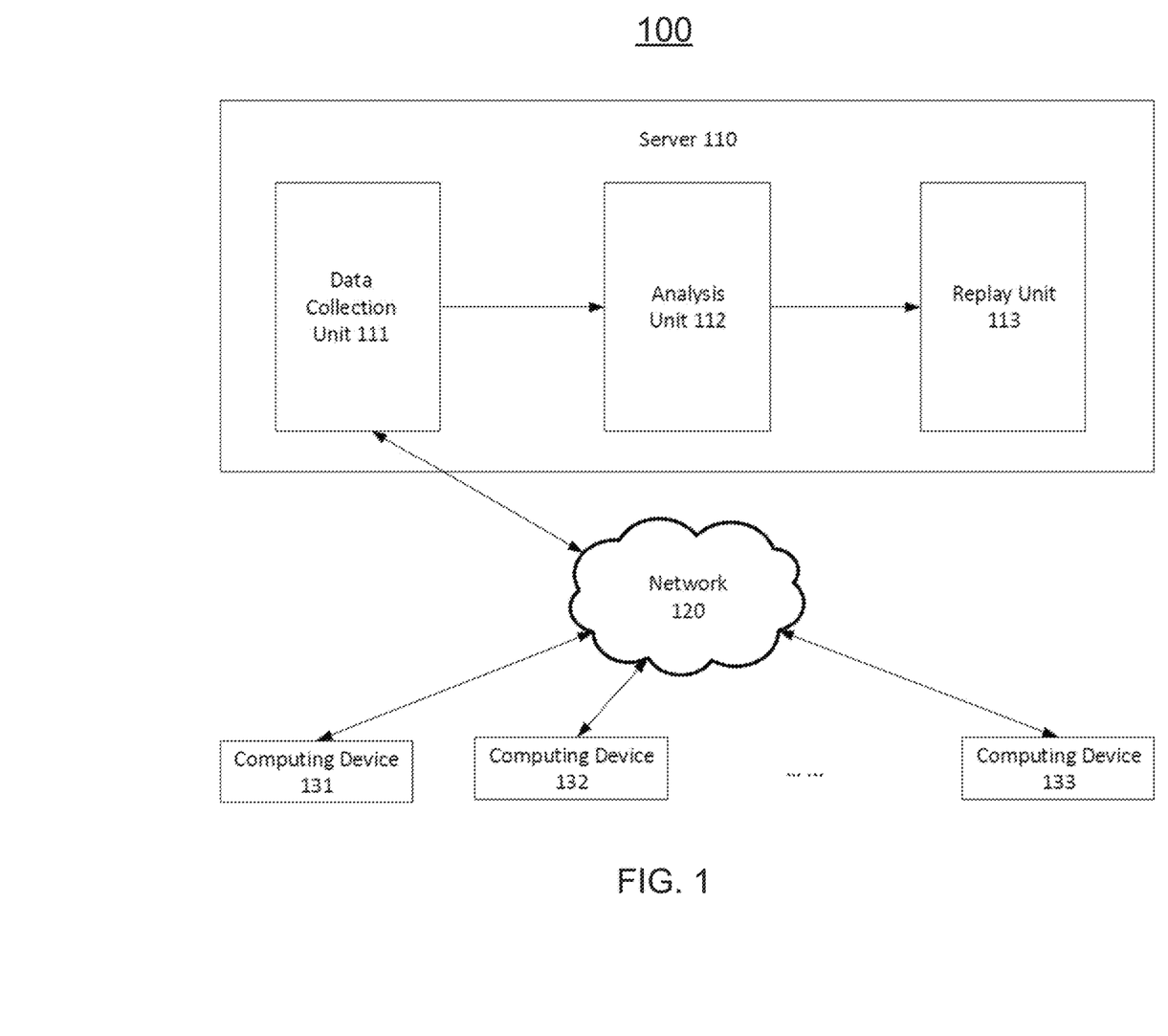
FIG. 1 is a block diagram illustrating an indexable and searchable replay system, consistent with exemplary embodiments of the present disclosure.

FIG. 1 is a block diagram illustrating a user behavior replay system 100, consistent with exemplary embodiments of the present disclosure. The system 100 may also be referred to as a system for monitoring and analyzing user reactions to contents provided through a network. The system 100 may include a server 110, and one or more computing devices (e.g., computing devices 131, 132, 133, etc.) coupled together through a network 120. The computing devices may have various embodiments, such as laptops, desktops, tablets, e-readers, cellphones, wearable devices, Google Glasses, and the like. Some of the components shown in FIG. 1, such as the computing devices 132 and 133 may be optional. The network 120 may be any type of network, such as the Internet (e.g., based on cables, optical fibers, or wireless connections), a nationwide cellular network, a local wireless network (e.g., Bluetooth™ or WiFi), or a wired network.

The server 110 may have various implementations. In some embodiments, the server 110 may comprise a data collection unit 111, an analysis unit 112, and a replay unit 113. The data collection unit 111, the analysis unit 112, and the replay unit 113 may be operatively connected to each other via a bus or other types of communication channels. In some embodiments, the server 110 may include many more components than those shown in FIG. 1. However, it is not necessary that all of these components be shown in order to disclose an illustrative embodiment.

The data collection unit 111 may include connectors for wired communications, wireless transmitters and receivers, and/or wireless transceivers for wireless communications. The connectors, transmitters/receivers, or transceivers may be configured for two-way communication among the server 110, and the various computing devices. The data collection unit 111 may send and receive data via internet cables, communication cables, wireless networks, or other communication media. The analysis unit 112 may be configured to analyze the collected user behavior data. The replay unit 113 may be configured to replay selected user behavior data.

Figure 2:
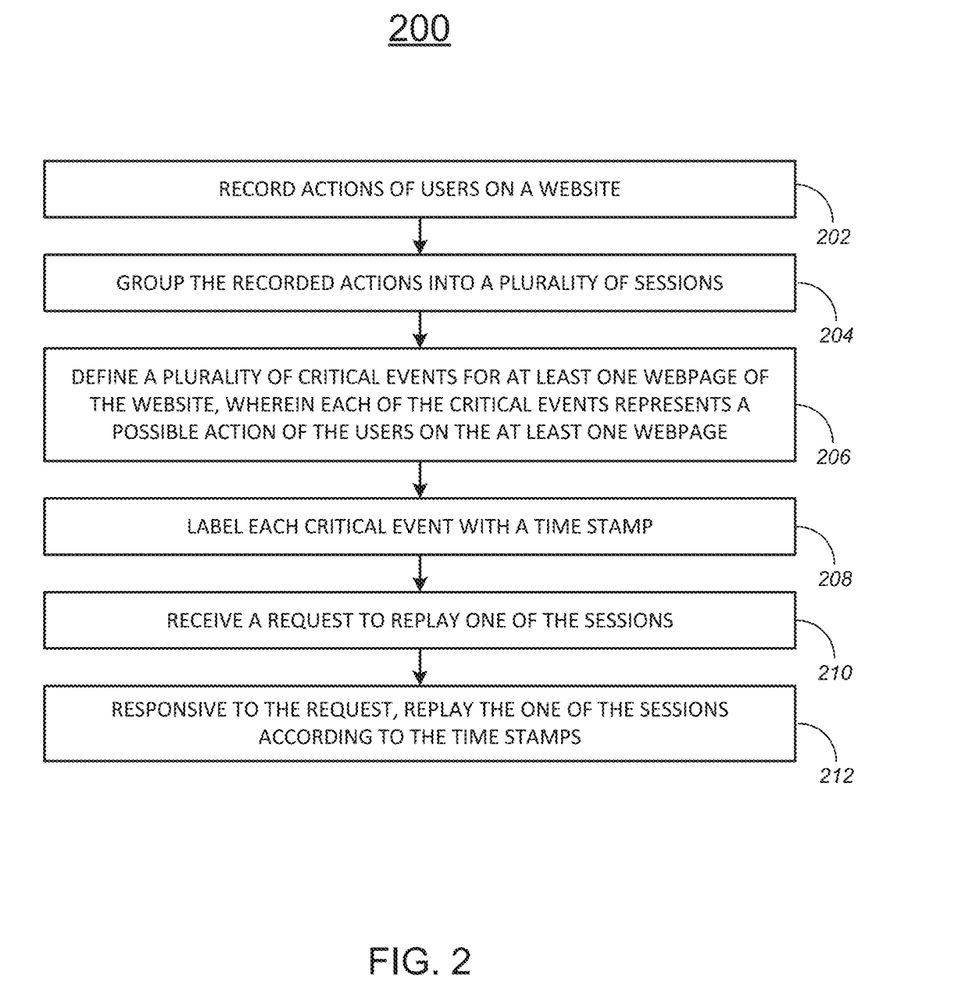
FIG. 2 is a flow diagram illustrating a method for replaying user behavior, consistent with exemplary embodiments of the present disclosure.

FIG. 2 is a flow diagram illustrating a method 200 for user behavior replay, consistent with exemplary embodiments of the present disclosure. At step 202, the data collection unit 111 records actions of users on the website. In particular, the data collection unit 111 collects user behavior data from the computing devices 131, 132, 133, etc. via the network 120.

At step 204, the recorded actions are grouped into a plurality of sessions. In particular, a plurality of the recorded actions are grouped into one of the sessions when (i) the plurality of the recorded actions are defined as critical events, (ii) the plurality of the recorded actions correspond to one of the users, and (iii) no two consecutive ones of the plurality of the recorded actions are separated in time by more than a predetermined interval. In some embodiments, the user behavior data may be recorded with and identified by a session ID. In other embodiments, the sessions may be created after recording. A session may be defined as an episode of continuous user actions. The user actions may refer to a click or a screen cursor movement action through a mouse, a keyboard entry through a keyboard, a voice command through a microphone, a touch command through a touch screen, or a gesture command through a camera, and so on. The user actions may be monitored by the data collection unit 111 through user input devices in the computing devices (131, 132, 133, etc.). The user input devices may include a mouse, a keyboard, a microphone, a touch screen, a camera, and so on.

"Continuous user actions" may refer to a series of user actions, where a time interval between any two successive user actions is within a time threshold. The time threshold is a predetermined value, and can be determined by a client of the user behavior replay system. For example, the time threshold can be set as 10 min, 15 min, 30 min, etc., depending on the client's request. When the time interval between two successive user actions (e.g., Action 1 and Action 2) is larger than the time threshold, the session of the user behavior data is terminated, and a new session may begin as further action is performed. In other words, Action 1 is recorded in a first session, and assigned with a first session ID (e.g., Session 1), and when Action 2 is performed, Action 2 is recorded in a second session, and assigned with a second session ID (e.g., Session 2).

In some embodiments, a session may be terminated when a window display (e.g. a webpage) is closed. In some embodiments, a session may be terminated when a plurality of related window displays is closed. For example, a user may perform the following actions: opening a homepage of an E-commerce website, clicking and opening a first product page (Page1), then closing Page 1, then clicking and opening a second product page (Page 2), then closing Page 2, then closing the homepage of the E-commerce website. A session may begin recording the user behavior when the user opens the homepage. If a time interval between any two successive actions is larger than a time threshold, the session may be terminated, and a new session may begin when the next action is performed. The session may also be terminated when all webpages that are related to the E-commerce website are closed, i.e., Page 1, Page 2, and the homepage. In this case, because the homepage is the last webpage that relates to the E-commerce website, then the session may be terminated as the user closes the homepage. It should be noted that, while various embodiments are described with reference to E-commerce websites and webpages, the disclosed technology is applicable to any website or webpage.

In some embodiments, the time interval between successive user actions is monitored by the data collection unit 111. To monitor the time interval, the data collection unit may monitor activities of at least one of the mouse, the keyboard, the microphone, the touch sensor, the camera, the display, etc. For example, if the mouse registers a click directed to a certain link of an item, the data collection unit 111 may determine a beginning of a time interval; if the touch screen registers a closing command of a window displaying, the data collection unit 111 may determine an end of the time interval.

In some embodiments, the user behavior data in each session collected by the data collection unit 111 may include one or more critical parameters of the user behavior. There may be many types of critical parameters, for example, time duration, time stamp, geographic location, item information (e.g., item name, description, color, size, price, category, shipping method, shipping time, and related items), user information or corresponding classification (e.g., income level, home address, zip code, age, job, education, habit, cultural background, religion, purchase history, browse history, search history, user input), etc.

At step 206, one or more critical events may be defined for at least one webpage of the website. Each of the critical events represents a possible action of the users on a webpage. The critical events are predetermined events/user actions that may be considered as useful or important by a client of the user behavior replay system. For example, a critical event can be "visiting homepage", "add to cart", "make a payment", etc. The critical events can be customized based on the client's request, and different clients may define different sets of critical events. Once defined, the critical events can also be updated.

Figure 3A:
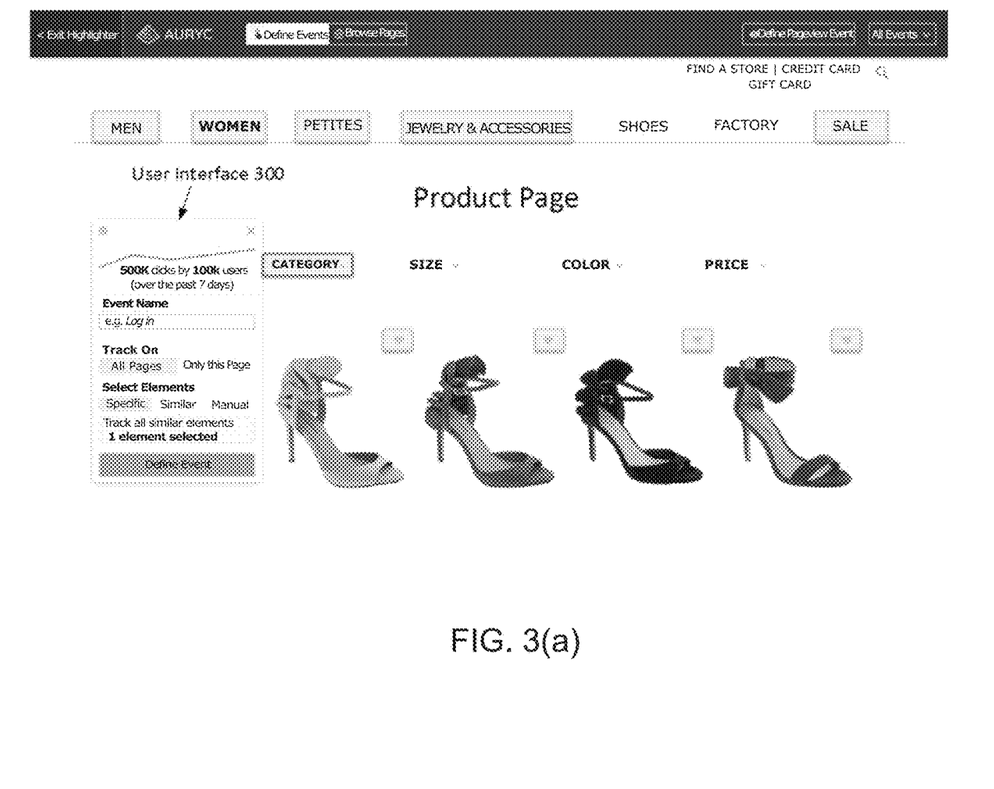
FIG. 3(a)-(b) are graphic illustrations showing exemplary user interfaces for a client to define a critical event, consistent with exemplary embodiments of the present disclosure.

The definition of critical events may be customized based on the content of the webpages that are recorded and analyzed. Any user action on the webpages can also be defined as a critical event. As shown in FIG. 3(a), a product page (shoe shopping page) of an E-commerce website is an example. The product page may include a plurality of clickable buttons, each of which may offer an option for a user to view different content/products in the E-commerce website. For instance, the user may click "jewelry & accessories" to view products of jewelry & accessories in the E-commerce website, or click "sale" to view products that are on sale in the E-commerce website, etc. The product page may also include clickable buttons that function as filters for the user to view products for different preferences. For example, by selecting items in "category", the user may only browse a specific type of products, e.g., sandals, boots, etc., and by clicking "size", the user may choose a particular size, e.g., size 7, size 11, etc. There may be many more clickable buttons with different functions and contents than what are listed here and presented in FIG. 3(a). Any user action, for example, clicking a button, selecting an item, etc., can be defined as a critical event.

FIG. 3(a) provides an exemplary user interface 300 for defining critical events in the user behavior replay system. The user interface 300 may be a WYSIWYG editor or program, which allows a developer to see what the end result will look like while the interface or document is being created. As shown in the user interface 300, a client can define an event name, for example, "log in", "view shoes page", "selecting <$100", etc. For instance, a critical event is defined as "selecting <$100". Then if a user chooses to browse products whose prices are under $100, and clicks "<$100" under the "price" filter, then this action will be labeled as the critical event "selecting <$100" in the corresponding session of user behavior data. A client can also define the critical event as a "one-page event", or a "whole-website event" by selecting the "track on" option. A "one-page" event is an event whose definition is only effective within a particular page, for example, a user action that clicks "<$100" under the "price" filter in the shoe page will be labeled as the critical event, while a user action that clicks "<$100" under the "price" filter in the any other page (e.g., jewelry, dress, etc.) will not be labeled as the critical event. On the other hand, a "whole-website event" is an event whose definition is effective in all pages of the E-commerce website. In addition, with the user interface 300 in FIG. 3(a), a client may define a critical event with a specific element, for example, "selecting <$100" refers to clicking "<$100" under the "price" filter. Similarly, the definition of an critical event may cover a plurality of similar elements. For example, "selecting <$100" may not only include clicking "<$100" under the "price" filter, but also include clicking other items under the "price" filter, such as, "$100 to $200", "$200 and above", etc. Further, the user interface 300 in FIG. 3(a) may also provide a manual option for the client to manually define every element/detail of a critical event.

Figure 3B:
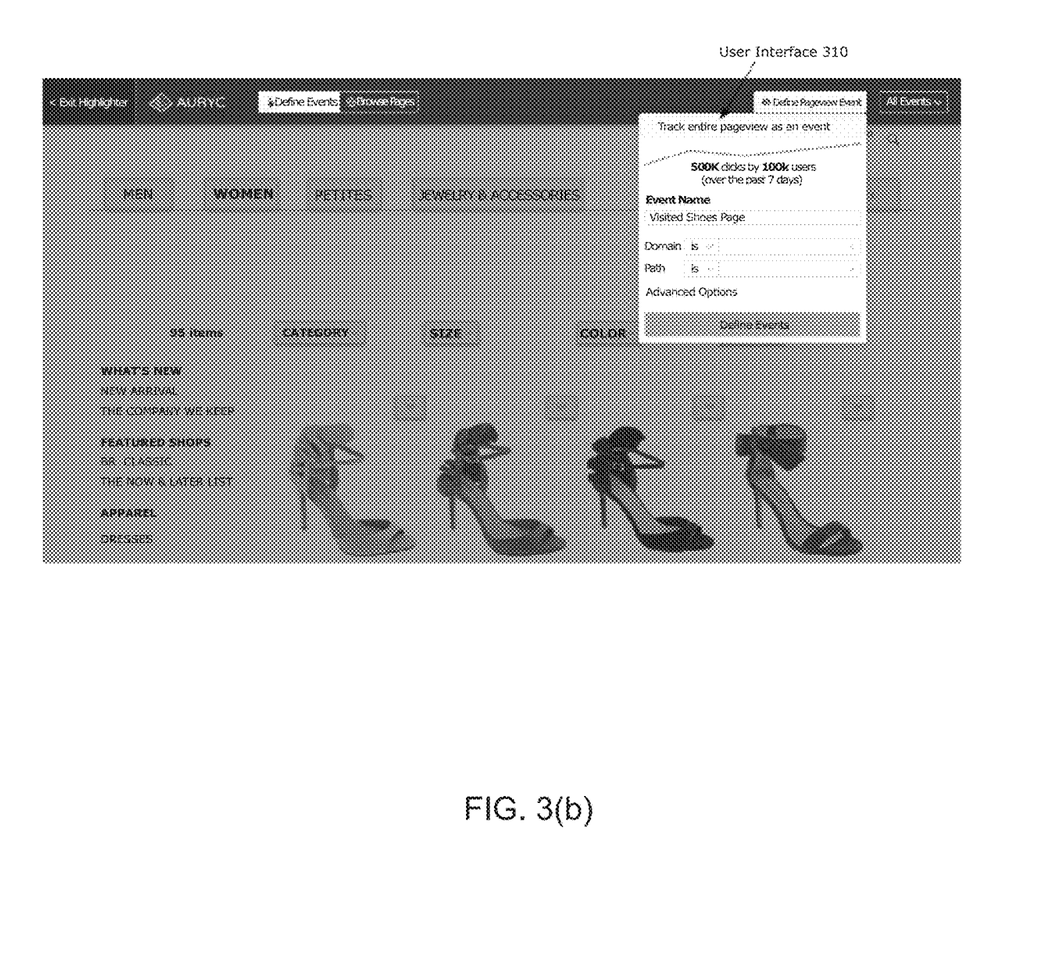

FIG. 3(b) provides another exemplary user interface 310 for defining critical events in the user behavior replay system. The user interface 310 may be a WYSIWYG editor or program, which allows a developer to see what the end result will look like while the interface or document is being created. A critical event can be defined as visiting a certain webpage. With the user interface 310, any webpage can be defined by its domain and path. By defining a domain and path of a webpage, the webpage can be identified, and a critical event, for example, "visiting shoes page" can be defined.

It will be appreciated that the method for a client to define a critical event is not limited to the exemplary user interfaces that have been described above and illustrated in the accompanying drawings, and that various modifications and changes can be made without departing from the scope thereof.

Figure 4:
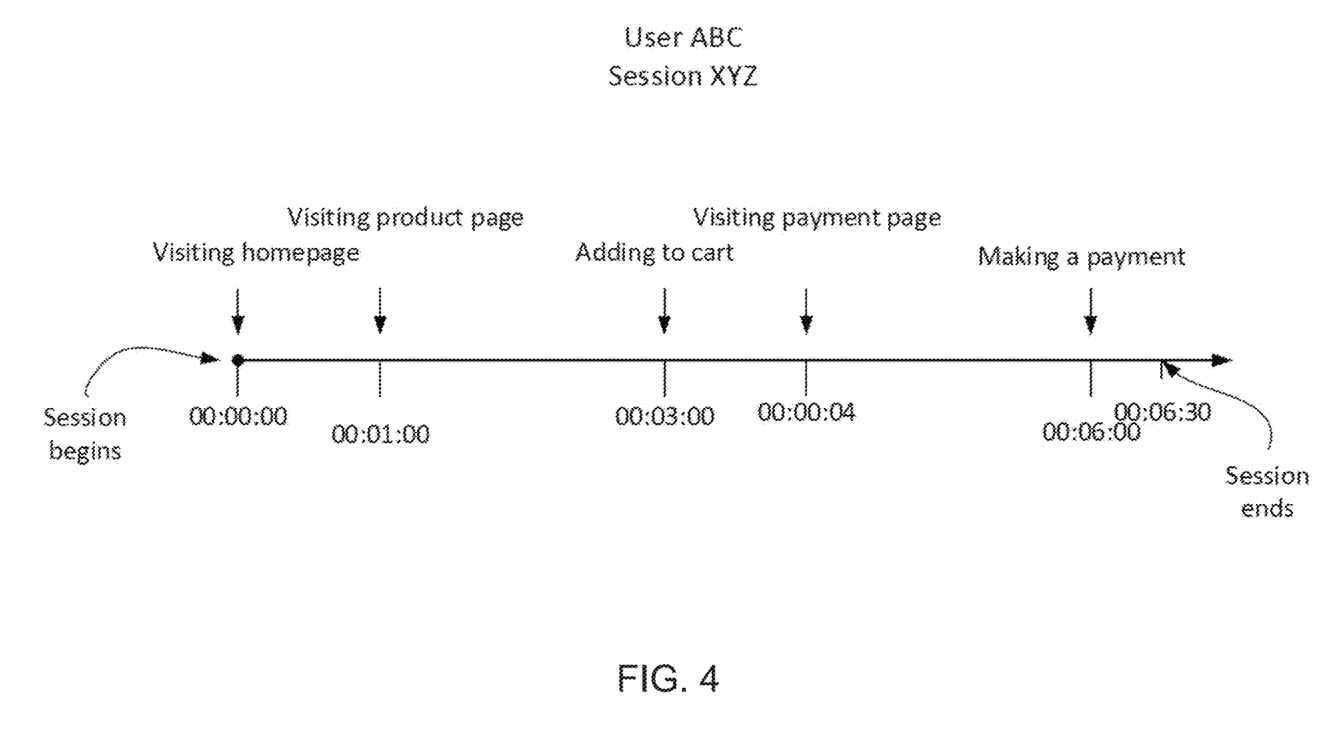
FIG. 4 is graphical presentation illustrating an exemplary indexed session of user behavior data with critical events and time stamps, consistent with exemplary embodiments of the present disclosure.

At step 208, with a set of defined critical events, the analysis unit 112 analyzes each session of user behavior data, and identifies and labels the critical events with time stamps in the session of user behavior data. Each critical event in a session is labeled with a time stamp relative to a start of the session. Take a session of user behavior data for an E-commerce website as an example. FIG. 4 represents an exemplary indexed session of user behavior data with critical events and time stamps. Session XYZ records a user ABC's shopping experience on the E-commerce website. In Session XYZ, at time 00:00:00, user ABC visited the homepage of the E-commerce website; at time 00:01:00, user ABC visited a product page (Product 1, Page 1); at time 00:03:00, user ABC added Product 1 into the shopping cart; at time 00:03:05, user ABC closed Page 1; at time 00:04:00, user ABC visited the payment page; at time 00:06:00, user ABC clicked "make a payment"; and at 00:06:30, user ABC closed all webpages related to the E-commerce website. In this example, Session XYZ begins at time 00:00:00, and ends at 00:06:30. A duration time of Session XYZ is 6 minutes and 30 seconds. If a set of critical events for this E-commerce website is defined as "visiting homepage", "visiting product page", "add to cart", "visiting payment page", "make a payment", etc., then a set of time stamps 00:00:00, 00:01:00, 00:03:00, 00:04:00, 00:06:00 associated with the critical events "visiting homepage", "visiting product page", "add to cart", "visiting payment page", "make a payment", respectively, can be created and labeled to the Session XYZ by the analysis unit 112. FIG. 3 is mainly for the purpose to show the idea of an indexed session of user behavior. For a real indexed session of user behavior, the critical events and the associated time stamps may be labeled to the recorded views in the session of user behavior data.

Having been analyzed by the analysis unit 112, each session of user behavior data is identified by a session ID, and labeled with the critical events with the associated time stamps. Each session of user behavior data also includes critical parameters, for example, time duration, time stamp, geographic location, item information (e.g., item name, description, color, size, price, category, shipping method, shipping time, and related items), user information or corresponding classification (e.g., income level, home address, zip code, age, job, education, habit, cultural background, religion, purchase history, browse history, search history, user input), etc. Sessions of user behavior data are then input to the replay unit 113 for replay.

At step 210, the replay unit 113 may receive a request to replay one of the sessions. At step 212, responsive to the request, the replay unit 113 replays the requested session according to the time stamps of the critical event. That is, the replay unit 113 replays sessions of user behavior data, and the sessions of user behavior data can be sorted, indexed and searched by session IDs, critical events, time stamps or other critical parameters as discussed above.

In some embodiments, sessions of user behavior data can be searched by session IDs. For example, by searching a session ID "XYZ", Session XYZ can be found and retrieved from sessions of user behavior data. By selecting replay, the recorded user behavior in Session XYZ can by replayed. In some embodiments, critical events with associated time stamps in Session XYZ may be presented in a list of critical events. Each item in the list represents a critical event. By selecting an item in the list of critical events, a view of the specific critical event in Session XYZ may be selected and replayed. In some embodiments, critical parameters including, for example, geographic location, item information, user information, corresponding classification, etc., may be presented in a list of critical parameters for each session.

In some embodiments, sessions of user behavior data can be searched by critical events. Responsive to receiving the search query, one or more sessions that include the searched critical events are provided. For example, by searching a critical event "make a payment", any session that includes the critical event "make a payment" can be found and retrieved from sessions of user behavior data. The retrieved sessions may be presented in a list of sessions identified by their session IDs. Each item in the list represents a session that includes the critical event "make a payment". By selecting an item of the list of sessions, the selected session can be replayed. In some embodiments, critical parameters including, for example, geographic location, item information, user information, corresponding classification, etc., may be presented in a list of critical parameters for the selected session.

In some embodiments, sessions of user behavior data can be searched by a critical parameter. For example, by searching a critical parameter "zip code=95050", any session that includes the critical parameter (i.e., zip code=95050) can be found and retrieved. The retrieved sessions may be presented in a list of sessions identified by their session IDs. Each item in the list presents a session that includes the critical parameter (i.e., zip code=95050). By selecting an item in the list of sessions, the selected session can be replayed. In some embodiments, critical events with associated time stamps may be presented in a list of critical events for the selected session. By selecting a critical event in the list of critical events, a view of the specific critical event in the selected session may be selected and replayed.

In some embodiments, a session may be replayed with a full record of user behavior data, i.e., the session is replayed from the beginning of the session to the end of the session. In some embodiments, a session may be replayed with selected views. For example, the views that include critical events may be selected and replayed, and views that do not include critical events may be skipped and not replayed. In some embodiments, a series of searches can be performed successively to find a desired session. A former search may retrieve a list of selected sessions, and a latter search may perform further a search within the list of selected session.

This disclosure presents a customizable system and method for recording, searching, and replaying user behaviors on a computing devices. With this system and method, a client of the user behavior replay system can perform searches among the collected user behavior data with session IDs, critical events, and critical parameters. This provides a more target-oriented and more efficient way for the client to understand user behaviors. For example, by searching critical events, a client finds an unexpected number of sessions stopped at a critical event "visiting payment page" (i.e., the following critical event "make a payment" does not occur). Then the client may focus on the payment page, for example, checking whether any link is broken, or sending a survey/feedback request to the user, or popping up a widow offering help to the user, etc. The system and method disclosed in this disclosure may provide the client with a better way to understand user behaviors, thus, helping the client to identify issues, solve problems and serve their users.

Figure 5:
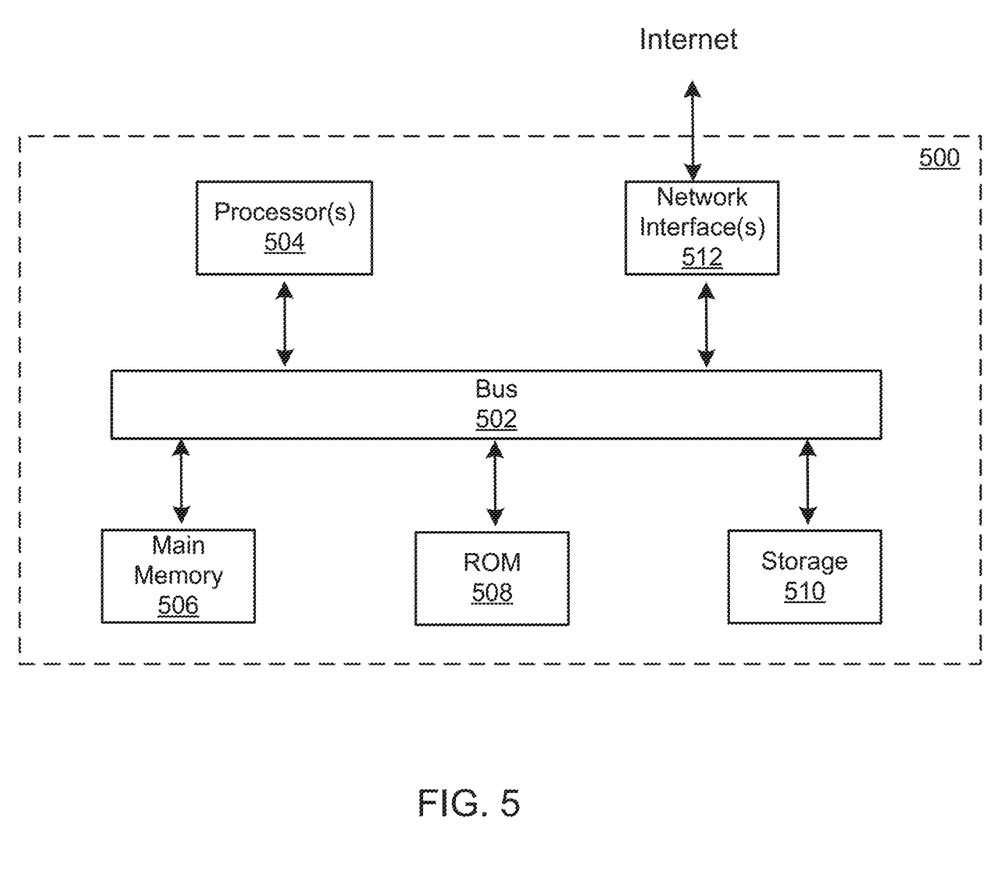
FIG. 5 illustrates a block diagram of an exemplary computer system to implement one or more of functionalities of the disclosed system according to various embodiments.

FIG. 5 illustrates a block diagram of an exemplary computer system 500 to implement one or more of functionalities of the disclosed system according to various embodiments. In some embodiments, the system 500 may correspond to one or more of the data collection unit 111, the analysis unit 112, and the replay unit 113 illustrated in FIG. 1. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

A person skilled in the art can further understand that various exemplary units and algorithm steps described with reference to the disclosure herein may be implemented as specialized electronic hardware, computer software, or a combination of electronic hardware and computer software. For examples, the units may be implemented by one or more processors to cause the one or more processors to become one or more special purpose processors to execute software instructions stored in a computer-readable storage medium to perform the specialized functions of the units.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more tangible and/or non-transitory computer-readable storage media containing computer-readable program codes. Common forms of non-transitory computer readable storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a computer, an embedded processor, or other programmable data processing devices to produce a special purpose machine, such that the instructions, which are executed via the processor of the computer or other programmable data processing devices, create a means for implementing the function specified in one or more flows in the flow diagrams and/or one or more blocks in the block diagrams.

These computer program instructions may also be stored in a computer readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions (which are executed on the computer or other programmable devices) provide steps for implementing the functions specified in one or more flows in the flow diagrams and/or one or more blocks in the block diagrams. In a typical configuration, a computer device includes one or more Central Processors (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage can be implemented with any method or technology. Information may be modules of computer-readable instructions, data structures and programs, or other data. Examples of a non-transitory computer readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include: transitory media, such as modulated data signals and carrier waves.

The specification has described a method for indexable and searchable replaying of user behavior data, and a system for indexable and searchable replay. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method, comprising:
    recording actions of users on a designated web site;
    grouping the recorded actions into a plurality of sessions, wherein each of the plurality of sessions includes a plurality of views, and is associated with a plurality of webpages related to the designated website, and each of the plurality of sessions begins when a homepage of the designated web site is open and terminates when all of the plurality of webpages are closed;
    providing, on a current webpage of the designated web site, a user interface comprising one or more action fields and one or more page fields for defining a critical event, the user interface overlaid on top of the current webpage of the designated website such that the user interface and the current webpage are viewable together;
    receiving, through the one or more action fields on the user interface, a first user input indicating whether the critical event is effective only on the current webpage or on all webpages of the designated website;
    receiving, through the one or more page fields, a second user input and a third user input, the second user input indicating one or more page elements on the current webpage that trigger the critical event upon being selected, wherein:
        if the first user input indicates that the critical event is effective only on the current webpage, only a selection of the one or more page elements on the current webpages triggers the critical event, and
        if the first user input indicates that the critical event is effective on all webpages of the designated website, a selection of the one or more page elements on any webpage of the designated website triggers the critical event upon, and
        the third user input indicating a manually defined element, the manually defined element being a user-customizable definition of activity that constitutes the critical event, the critical event being triggered when the activity according to the user-customizable definition occurs;
    defining, based on the one or more action elements and the one or more page elements through the user interface, a plurality of critical events;
    detecting one or more critical event occurrences in the plurality of sessions according to the plurality of critical events;
    displaying, on the user interface, a number of user actions and/or a number of unique users over a period of time relating to the plurality of critical event occurrences;
    labeling each of the critical event occurrences with a time stamp;
    receiving a request to replay one of the sessions; and
    responsive to the request, replaying the one of the sessions by:
        selecting one or more views of the one of the sessions that include at least one of the plurality of critical event occurrences; and
        replaying the selected one or more views according to the time stamp of the at least one critical event occurrence on the webpage with the user interface displayed thereover.

2. The method of claim 1, further comprising:
    receiving a search query that specifies at least one of the critical event occurrences; and
    responsive to receiving the search query, providing a session of the plurality of sessions that includes the at least one of the critical event occurrences.

3. The method of claim 1, wherein the grouping comprises:
    grouping a plurality of the recorded actions into one of the sessions when (i) the plurality of the recorded actions are defined as the critical event occurrences, (ii) the plurality of the recorded actions correspond to one of the users, and (iii) no two consecutive ones of the plurality of the recorded actions are separated in time by more than a predetermined interval.

4. The method of claim 1, wherein the labeling comprises:
    labeling each of the critical event occurrences in each session with a time stamp relative to a start of the session.

5. The method of claim 1, further comprising:
    recording one or more critical parameters, wherein each of the critical parameters represents at least one of a time duration, a time stamp, a geographic location, item information for an item offered for sale on the plurality of webpages, user information, and classification of the user;
    identifying each session with a session ID;

receiving a search query that specifies at least one of the critical event occurrences, the time stamps, the session IDs, and the critical parameters; and responsive to receiving the search query, providing a session of the plurality of sessions that includes the at least one of the critical event occurrences, the time stamps, the session IDs, and the critical parameters.

6. The method of claim 1, wherein the user interface is a WSYIWYG editor or program.

7. The method of claim 1, further comprising:

receiving a request to replay only a portion of one of the sessions; and responsive to the request, replaying only the portion of the one of the sessions.

8. A non-transitory computer-readable medium having instructions stored therein, the instructions being executable by one or more processors to cause the one or more processors to perform a method comprising:

recording actions of users on a designated web site;

grouping the recorded actions into a plurality of sessions, wherein each of the plurality of sessions includes a plurality of views, and is associated with a plurality of webpages related to the designated website, and each of the plurality of sessions begins when a homepage of the designated website is open and terminates when all of the plurality of webpages are closed;

providing, on a current webpage of the designated web site, a user interface comprising one or more action fields and one or more page fields for defining a critical event, the user interface overlaid on top of the current webpage of the designated website such that the user interface and the current webpage can be viewed together;

receiving, through the one or more action fields on the user interface, a first user input indicating whether the critical event is effective only on the current webpage or on all webpages of the designated website;

receiving, through the one or more page fields, a second user input and a third user input, the second user input indicating one or more page elements on the current webpage that trigger the critical event upon being selected, wherein:
- if the first user input indicates that the critical event is effective only on the current webpage, only a selection of the one or more page elements on the current webpages triggers the critical event, and
- if the first user input indicates that the critical event is effective on all webpages of the designated website, a selection of the one or more page elements on any webpage of the designated website triggers the critical event upon, and
- the third user input indicating a manually defined element, the manually defined element being a user-customizable definition of activity that constitutes the critical event, the critical event being triggered when the activity according to the user-customizable definition occurs;

defining, based on the one or more action elements and the one or more page elements through the user interface, a plurality of critical events;

detecting one or more critical event occurrences in the plurality of sessions according to the plurality of critical events;

displaying, on the user interface, a number of user actions and/or a number of unique users over a period of time relating to the plurality of critical event occurrences;

labeling each of the critical event occurrences with a time stamp; receiving a request to replay one of the sessions; and responsive to the request, replaying the one of the sessions by:
- selecting one or more views of the one of the sessions that include at least one of the plurality of critical event occurrences; and
- replaying the selected one or more views according to the time stamp of the at least one critical event occurrence on the webpage with the user interface displayed thereover.

9. The medium of claim 8, wherein the method further comprises:

receiving a search query that specifies at least one of the critical event occurrences; and responsive to receiving the search query, providing a session of the plurality of sessions that includes the at least one of the critical event occurrences.

10. The medium of claim 8, wherein the grouping comprises:

grouping a plurality of the recorded actions into one of the sessions when (i) the plurality of the recorded actions are defined as the critical event occurrences, (ii) the plurality of the recorded actions correspond to one of the users, and (iii) no two consecutive ones of the plurality of the recorded actions are separated in time by more than a predetermined interval.

11. The medium of claim 8, wherein the labeling comprises:

labeling each of the critical event occurrences in each session with a time stamp relative to a start of the session.

12. The medium of claim 8, wherein the method further comprises:

recording one or more critical parameters, wherein each of the critical parameters represents at least one of a time duration, a time stamp, a geographic location, item information for an item offered for sale on the plurality of webpages, user information, and classification of the user;

identifying each session with a session ID;

receiving a search query that specifies at least one of the critical event occurrences, the time stamps, the session IDs, and the critical parameters; and responsive to receiving the search query, providing a session of the plurality of sessions that includes the at least one of the critical event occurrences, the time stamps, the session IDs, and the critical parameters.

13. The medium of claim 8, wherein the user interface is a WSYIWYG editor or program.

14. The medium of claim 8, wherein the method further comprises:

receiving a request to replay only a portion of one of the sessions; and responsive to the request, replaying only the portion of the one of the sessions.

15. A system comprising:

one or more processors; and a non-transitory computer-readable system having instructions stored therein, the instructions being executable by one or more processors to cause the one or more processors to perform a method comprising:

recording actions of users on a designated web site;

grouping the recorded actions into a plurality of sessions, wherein each of the plurality of sessions includes a plurality of views, and is associated with a plurality of webpages related to the designated website, and each of the plurality of sessions begins when a homepage of the designated website is open and terminates when all of the plurality of webpages are closed;

providing, on a current webpage of the designated website, a user interface comprising one or more action fields and one or more page fields for defining a critical event, the user interface overlaid on top of the current webpage of the designated website such that the user interface and the current webpage can be viewed together;

receiving, through the one or more action fields on the user interface, a first user input indicating whether the critical event is effective only on the current webpage or on all webpages of the designated website;

receiving, through the one or more page fields, a second user input and a third user input, the second user input indicating one or more page elements on the current webpage that trigger the critical event upon being selected, wherein:
  if the first user input indicates that the critical event is effective only on the current webpage, only a selection of the one or more page elements on the current webpages triggers the critical event, and
  if the first user input indicates that the critical event is effective on all webpages of the designated website, a selection of the one or more page elements on any webpage of the designated website triggers the critical event upon, and
  the third user input indicating a manually defined element, the manually defined element being a user-customizable definition of activity that constitutes the critical event, the critical event being triggered when the activity according to the user-customizable definition occurs;

defining, based on the one or more action elements and the one or more page elements through the user interface, a plurality of critical events;

detecting one or more critical event occurrences in the plurality of sessions according to the plurality of critical events;

displaying, on the user interface, a number of user actions and/or a number of unique users over a period of time relating to the plurality of critical event occurrences;

labeling each of the critical event occurrences with a time stamp; receiving a request to replay one of the sessions; and responsive to the request, replaying the one of the sessions by:
  selecting one or more views of the one of the sessions that include at least one of the plurality of critical event occurrences; and
  replaying the selected one or more views according to the time stamp of the at least one critical event occurrence on the webpage with the user interface displayed thereover.

16. The system of claim 15, wherein the method further comprises:
  receiving a search query that specifies at least one of the critical event occurrences; and
  responsive to receiving the search query, providing a session of the plurality of sessions that includes the at least one of the critical event occurrences.

17. The system of claim 15, wherein the grouping comprises:
  grouping a plurality of the recorded actions into one of the sessions when (i) the plurality of the recorded actions are defined as the critical event occurrences, (ii) the plurality of the recorded actions correspond to one of the users, and (iii) no two consecutive ones of the plurality of the recorded actions are separated in time by more than a predetermined interval.

18. The system of claim 15, wherein the labeling comprises:
  labeling each of the critical event occurrences in each session with a time stamp relative to a start of the session.

19. The system of claim 15, wherein the method further comprises:
  recording one or more critical parameters, wherein each of the critical parameters represents at least one of a time duration, a time stamp, a geographic location, item information for an item offered for sale on the plurality of webpages, user information, and classification of the user;
  identifying each session with a session ID;
  receiving a search query that specifies at least one of the critical event occurrences, the time stamps, the session IDs, and the critical parameters; and
  responsive to receiving the search query, providing a session of the plurality of sessions that includes the at least one of the critical event occurrences, the time stamps, the session IDs, and the critical parameters.

20. The system of claim 15, wherein the user interface is a WSYIWYG editor or program.

21. The system of claim 15, wherein the method further comprises: receiving a request to replay only a portion of one of the sessions; and responsive to the request, replaying only the portion of the one of the sessions.

* * * * *

UNITED STATES PATENT AND TRADEMARK OFFICE
CERTIFICATE OF CORRECTION

| | | |
|---|---|---|
| PATENT NO. | : 12,045,295 B2 | Page 1 of 1 |
| APPLICATION NO. | : 16/135393 | |
| DATED | : July 23, 2024 | |
| INVENTOR(S) | : Wang et al. | |

It is certified that error appears in the above-identified patent and that said Letters Patent is hereby corrected as shown below:

In the Specification

In Column 1, Line 14, delete "web site" and insert --website-- therefor

In Column 7, Line 34, delete "etc.)" and insert --etc.,)-- therefor

In the Claims

In Column 13, Line 47, in Claim 1, delete "web site;" and insert --website;-- therefor In Column 13, Line 53, in Claim 1, delete "web site" and insert --website-- therefor In Column 13, Lines 55-56, in Claim 1, delete "web site," and insert --website,-- therefor In Column 15, Line 19, in Claim 8, delete "web site;" and insert --website;-- therefor In Column 15, Lines 27-28, in Claim 8, delete "web site," and insert --website,-- therefor In Column 16, Line 64, in Claim 15, delete "web site;" and insert --website;-- therefor In Column 17, Lines 1-2, in Claim 15, delete "web site," and insert --website,-- therefor In Column 17, Lines 30-31, in Claim 15, delete "web site" and insert --website-- therefor Signed and Sealed this
Twenty-first Day of October, 2025

John A. Squires
*Director of the United States Patent and Trademark Office*